(12) United States Patent
Hartenstine et al.

(10) Patent No.: US 9,272,641 B2
(45) Date of Patent: Mar. 1, 2016

(54) CHILD SEAT

(75) Inventors: Curtis M. Hartenstine, Birdsboro, PA (US); Michael A. Gillett, Mohnton, PA (US); Sharon A. Gillett, Mohnton, PA (US)

(73) Assignee: Wonderland Nurserygoods Company Limited (HK)

( * ) Notice: Subject to any disclaimer, the term of this patent is extended or adjusted under 35 U.S.C. 154(b) by 553 days.

(21) Appl. No.: 13/535,400

(22) Filed: Jun. 28, 2012

(65) Prior Publication Data

US 2013/0001991 A1 Jan. 3, 2013

Related U.S. Application Data

(60) Provisional application No. 61/571,637, filed on Jul. 1, 2011.

(51) Int. Cl.
*A47D 1/10* (2006.01)
*B60N 2/28* (2006.01)
*B60N 3/10* (2006.01)

(52) U.S. Cl.
CPC ............ *B60N 2/2866* (2013.01); *B60N 2/2887* (2013.01); *B60N 3/101* (2013.01)

(58) Field of Classification Search
CPC .... B60N 2/2887; B60N 2/289; B60N 2/2893; B60N 2/2866; B60N 3/101
See application file for complete search history.

(56) References Cited

U.S. PATENT DOCUMENTS

| | | |
|---|---|---|
| 4,632,460 A | 12/1986 | Meeker et al. |
| 5,383,708 A | 1/1995 | Nagasaka et al. |
| 5,676,398 A | 10/1997 | Nurtsch |
| 5,695,243 A | 12/1997 | Anthony et al. |
| 5,957,531 A | 9/1999 | Kane et al. |
| 6,209,957 B1 | 4/2001 | Baloga et al. |
| 6,247,756 B1 | 6/2001 | Wagner |
| 6,908,100 B2 | 6/2005 | Kassai et al. |
| 7,445,230 B2 | 11/2008 | Kassai et al. |
| 7,488,038 B2 * | 2/2009 | Boyle et al. ............. 297/255 |
| 7,597,396 B2 | 10/2009 | Longenecker et al. |
| 8,056,975 B2 | 11/2011 | Longenecker et al. |
| 2002/0113470 A1 | 8/2002 | Kain |

(Continued)

FOREIGN PATENT DOCUMENTS

| | | |
|---|---|---|
| DE | 202010008803 U1 | 2/2011 |
| EP | 1078809 A1 | 2/2001 |
| EP | 2233348 A1 | 9/2010 |

(Continued)

*Primary Examiner* — David R Dunn
*Assistant Examiner* — Tania Abraham
(74) *Attorney, Agent, or Firm* — David I. Roche; Baker & McKenzie LLP

(57) ABSTRACT

A child seat includes a seat shell having an anchor strap made of a continuous web material, and a lock. The anchor strap has two end portions, and an intermediate portion between the two end portions. The two end portions are located at the rear of the seat shell and are respectively provided with fasteners operable to attach with an anchor structure of a vehicle, and the intermediate portion is folded over to define two segments of the web material. The lock can releasibly clamp a portion of the two segments, the intermediate portion extending outward from the lock to define a looped tab. Moreover, an interior of the seat shell can have a strap guiding structure including two sidewalls between which is defined a passage for the web material. The two sidewalls are substantially close to each other to prevent twisting of the web material.

25 Claims, 13 Drawing Sheets

(56) References Cited

U.S. PATENT DOCUMENTS

2003/0030311 A1  2/2003  Woodard et al.
2010/0033001 A1  2/2010  Boyer

FOREIGN PATENT DOCUMENTS

| | | |
|---|---|---|
| FR | 2883813 A1 | 6/2006 |
| JP | 5254367 F1 | 10/1993 |
| TW | 578032 | 5/2004 |
| TW | 587032 | 5/2004 |
| TW | 593013 | 6/2004 |
| TW | 593015 | 6/2004 |
| TW | I220891 | 9/2004 |
| WO | 2012049048 A1 | 4/2012 |

\* cited by examiner

ND SEAT

CROSS-REFERENCE TO RELATED APPLICATION

This application claims priority to U.S. Provisional Patent Application No. 61/571,637 filed on Jul. 1, 2011.

BACKGROUND

1. Field of the Invention

The present inventions relate to child seats, such as booster seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

However, the installation of the child safety seat with the seatbelt of the vehicle may be cumbersome to achieve, and improper installation may occur. To facilitate the installation of the child safety seat, certain seat designs may provide an internal harness that can securely anchor with the vehicle seat. However, the internal harness is usually implemented in child safety seats of more complex construction. There is a need for a design that can provide an internal harness which is easy to operate, and can also securely hold certain child seats such as booster seats on a vehicle's passenger seat.

SUMMARY

The present application describes child seats that include a seat shell having a rear, an anchor strap made of a continuous web material, and a lock. In some embodiments, the anchor strap has two end portions, and an intermediate portion between the two end portions. The two end portions are located at the rear of the seat shell and are respectively provided with two fasteners operable to attach with an anchor structure of a vehicle, and the intermediate portion is folded over to define two segments of the web material. The lock is operable to releasibly clamp a portion of the two segments, the intermediate portion extending outward from the lock to define a looped tab that is accessible from an outside of the seat shell.

In other embodiments, the child seat comprises a seat shell having a hollow interior provided with a strap guiding structure, the strap guiding structure including two opposing sidewalls adjacent to each other, an anchor strap assembly formed from a web material, and a lock operable to releasibly clamp a portion of the anchor strap assembly. The anchor strap assembly has two end portions, and an intermediate portion between the two end portions, wherein the two end portions are located at the rear of the seat shell and are respectively provided with two fasteners operable to attach with an anchor structure of a vehicle, and the web material travels through a passage defined between the two sidewalls, the two sidewalls being substantially close to each other so as to block twisting of the web material in the passage. The intermediate portion extends outward from the lock to define a looped tab that is accessible from an outside of the seat shell.

DETAILED DESCRIPTION OF THE EMBODIMENTS

Figure 1:
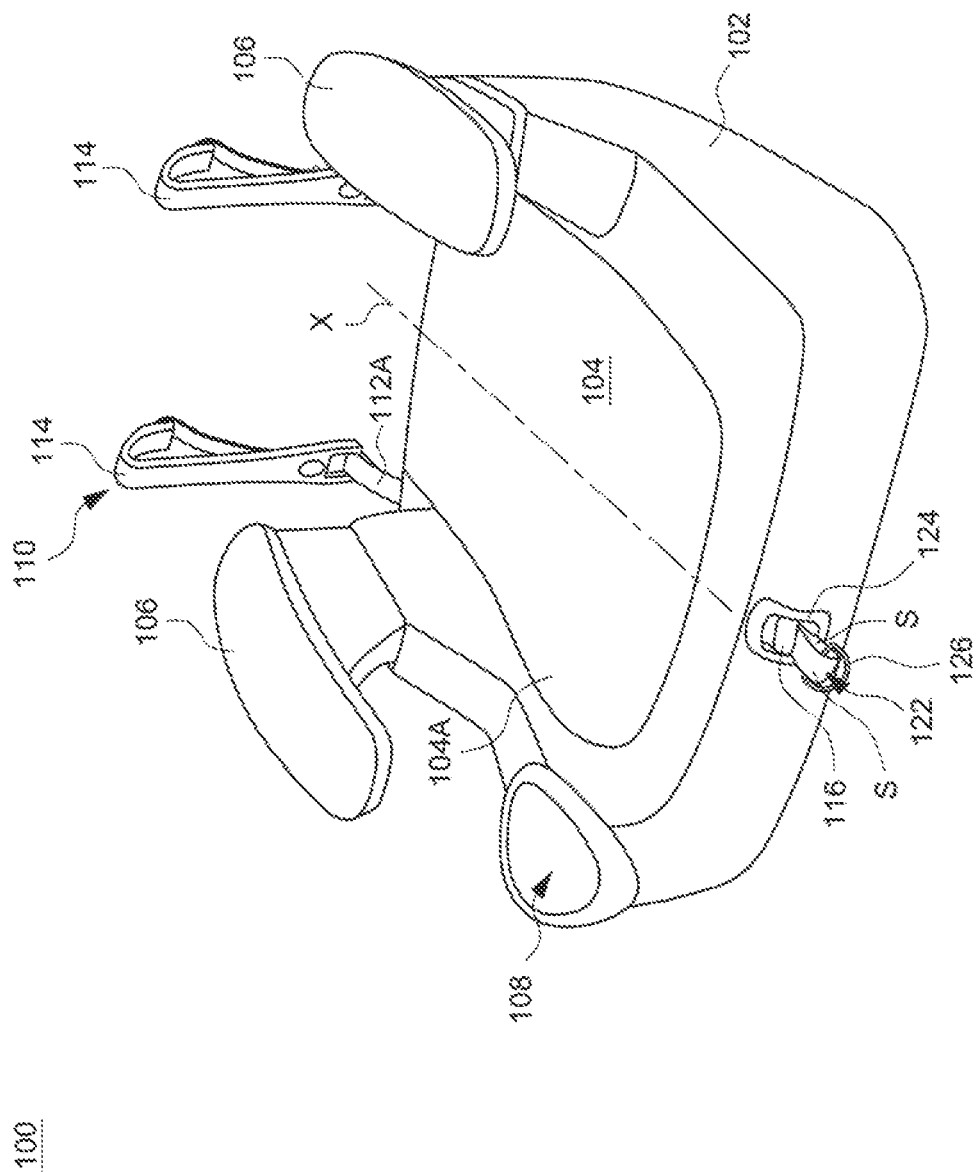
FIG. 1 is a perspective view illustrating an embodiment of a child seat.

FIG. 1 is a perspective view illustrating an embodiment of a child seat 100. The child seat 100 can be exemplary a booster seat having a seat shell 102 formed by plastic molding. The seat shell 102 can include a seat portion 104, armrests 106, and a cup cavity 108. The seat portion 104 can have an upper surface 104A on which a child can sit, and a bottom that can define a support plane for stable placement of the seat shell 102 on a vehicle's passenger seat. The armrests 106 may be integrally formed with the seat portion 104, or removably assembled therewith. The cup cavity 108 may be adapted to receive the placement of a drinking container at a position accessible by a child sitting on the seat portion 104. While the embodiment shows one cup cavity 108 provided at a front corner of the seat portion 104, alternate embodiments may place one or more of the cup cavity 108 at any locations that may be convenient in use. Moreover, while the illustrated embodiment does not have any seatback, alternate embodiments may include a seatback at a rear of the seat portion 104.

For convenient installation in a vehicle, the child seat 100 can include an internal restraint system 110 mounted with the seat shell 102. When the child seat 100 is installed on a vehicle's passenger seat, the restraint system 110 can attach with an anchor structure provided in the vehicle to hold the seat shell 102 in place.

Figure 2:
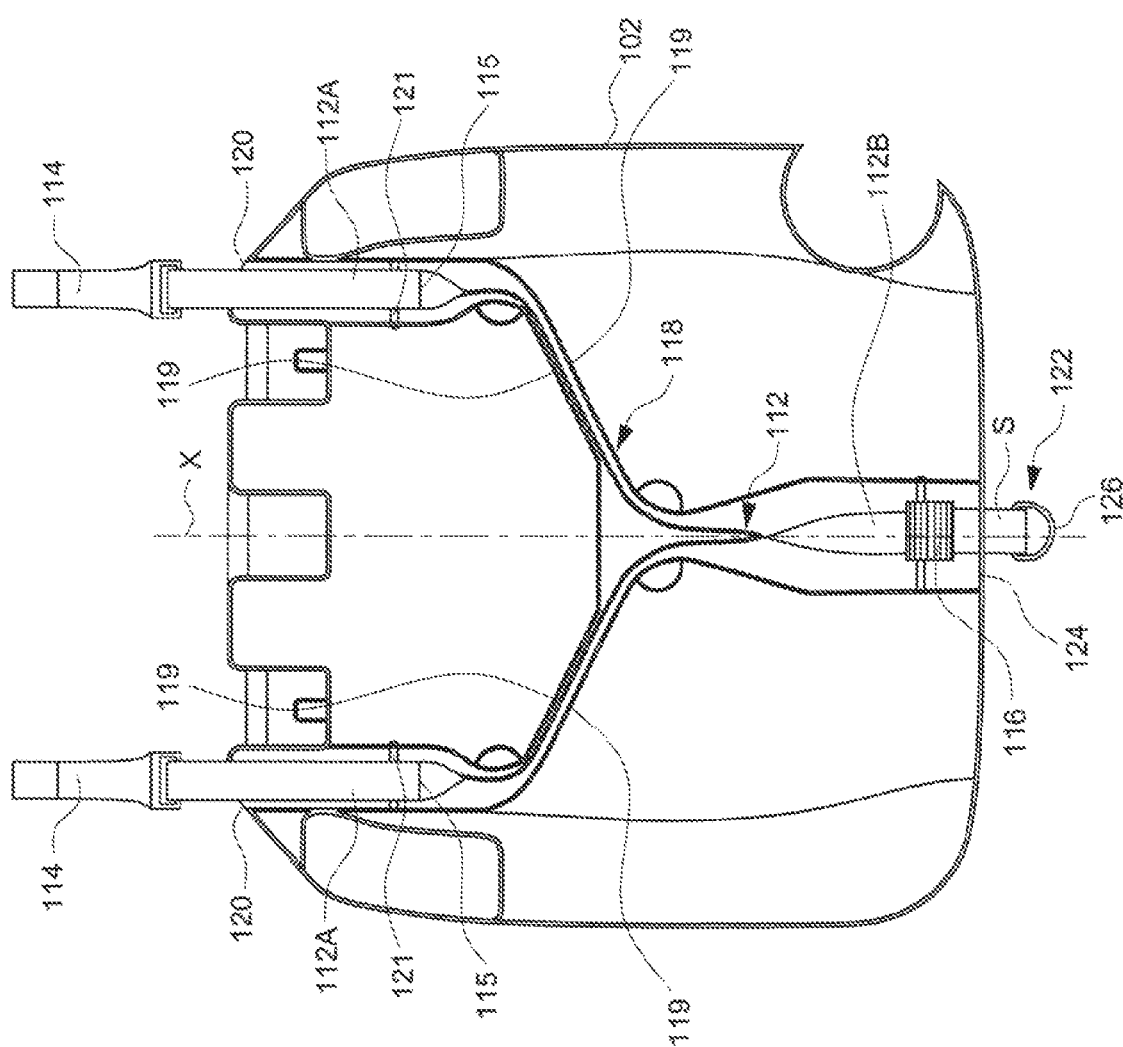
FIG. 2 is a schematic view illustrating the assembly of a restraint system provided in the child seat.

In conjunction with FIG. 1, FIG. 2 is a schematic view illustrating the assembly of the restraint system 110. The restraint system 110 can be assembled and held with the seat shell 102, and include an anchor strap 112, two fasteners 114 and a lock 116. The anchor strap 112 can be made of a single continuous web material having two end portions 112A, and an intermediate portion 112B between the two end portions 112A. The anchor strap 112 may be movably guided though a guide structure 118 formed in the hollow interior of the seat shell 102 such that the two end portions 112A can extend toward a rear of the seat shell 102, and the intermediate portion 112B can extend toward a front of the seat shell 102. The rear of the seat shell 102 refers to the side of the seat shell 102 located at the back of a child who sits on the seat shell 102. In one embodiment, the guide structure 118 can include a track defined between ribs along which the anchor strap 112 can be guided below the upper surface 104A of the seat portion 104. In alternate embodiments, the guide structure 118 may also include rollers, pin, pulleys, and like parts about which the web material may wrap to facilitate guiding of the anchor strap 112.

In the illustrated embodiment, the guide structure 118 can exemplary include portions of sidewalls 119 that are disposed adjacently facing each other to define a narrow passage for the web material of the anchor strap 112. The sidewalls 119 can be formed as protruding from any of an upper and a lower part of the seat shell 102. In this case, the web material of the anchor strap 112 can be restrictedly held in an upright position in the passage between the adjacent sidewalls 119 (i.e., standing close to a vertical direction), and then twist to a generally horizontal position in the area between the sidewalls 119 and the rear openings 120. The two sidewalls 119 can be substantially close to each other (e.g., the distance between the adjacent sidewalls 119 can be substantially smaller than the width of the web material) so as to define a narrow passage to restrict the web material and prevent its twisting, which can ensure smooth travel of the anchor strap 112 through the seat shell 102 during adjustment.

In the example shown in FIG. 2, two pairs of the sidewalls 119 can be symmetrically disposed at two sides of the axis X to guide the two divergent portions of the web material toward the rear of the seat shell 102. However, any placements of the sidewalls 119 may be realized in accordance with the desired travel path of the web material through the seat shell 102.

The two end portions 112A can respectively extend outward through two rear openings 120 of the seat shell 102, and can be securely assembled with the two fasteners 114 at the rear of the seat shell 102. The rear openings 120 can be located below the upper surface 104A of the seat portion 104 near its left and right sides. The fasteners 114 may be exemplary hook fasteners operable to lock with and unlock from an anchor structure affixed with the vehicle's passenger seat.

In the illustrated embodiments, the two end portions 112A may loop around a slot provided in the fasteners 114, and then closed via sewing lines 115. Each end portion 112A can thereby form a loop in which passes a fixed pin 121 that may be fixedly fastened with the seat shell 102. Each pin 121 can lie close or in a horizontal plane, and can be disposed between the rear opening 120 and the sidewalls 119 along the path of the web material. In case the looped end portion 112A is twisted, the pin 121 can prevent the twisted web material to propagate into the passage between the sidewalls 119. During adjustment, the interaction between each pin 121 and the sewing line 115 can also limit the extension of the anchor strap 112 at the rear of the seat shell 102.

The intermediate portion 112B can be folded over itself so as to define two segments S of the web material that can pass through the lock 116. The folded intermediate portion 112B disposed through the lock 116 can define a looped tab 122 that extends outward through a front opening 124 of the seat shell 102. In one embodiment, the front opening 124 can be located at a front region of the seat shell 102 substantially aligned with a central longitudinal axis X extending from the front to the rear. However, other positions may also be suitable. The tab 122 can be accessible from an outside of the seat shell 102 for adjustment of the anchor strap 112. A gripping part 126 may be mounted with the tab 122 to prevent inadvertent slipping of the tab 122 toward the interior of the seat shell 102 so that it becomes disengaged from the lock 116. The gripping part 126 can also facilitate grasping and manipulation of the tab 122 for adjusting the anchor strap 112. In one embodiment, the gripping part 126 can exemplary be a ring, a loop or like members.

Figure 3:
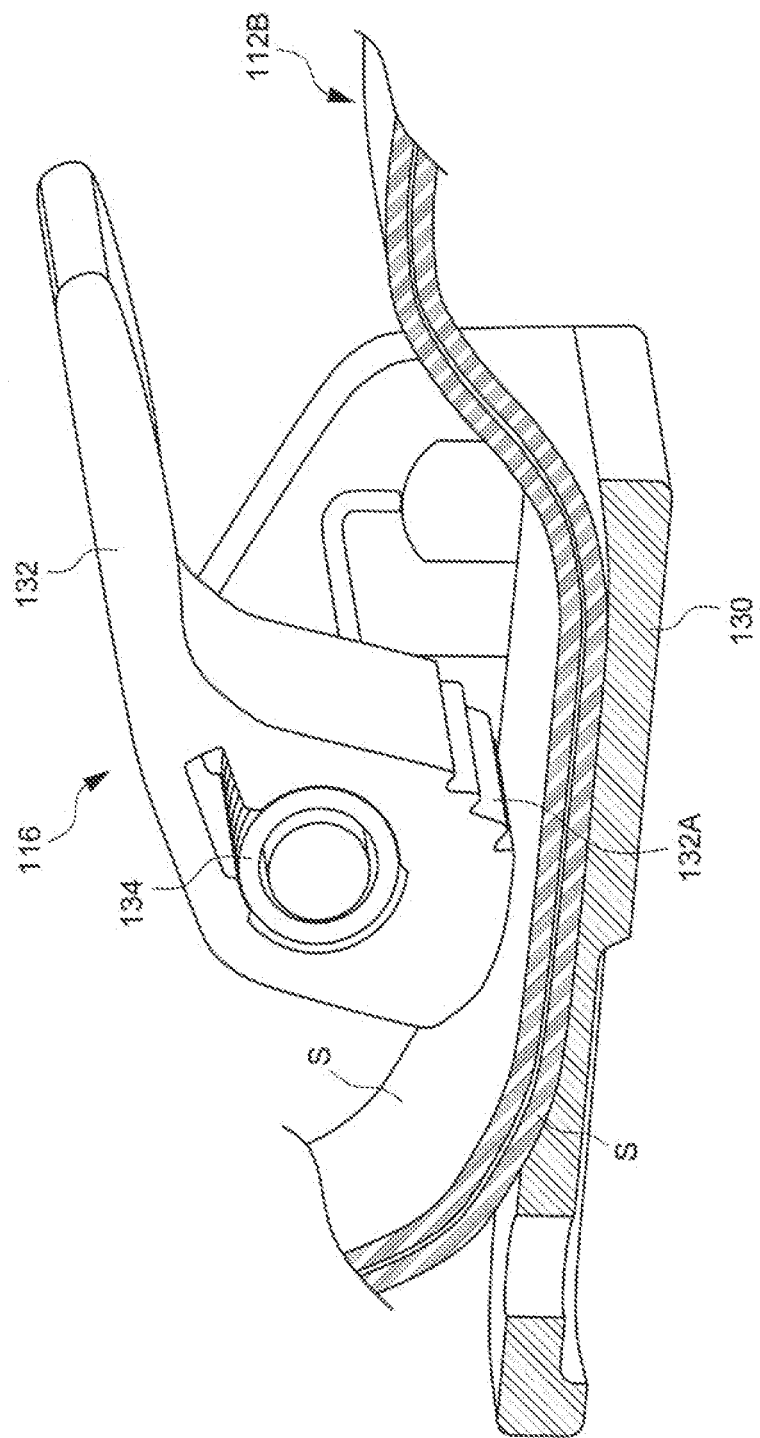
FIG. 3 is a schematic view illustrating an exemplary construction of the lock.
Figure 4:
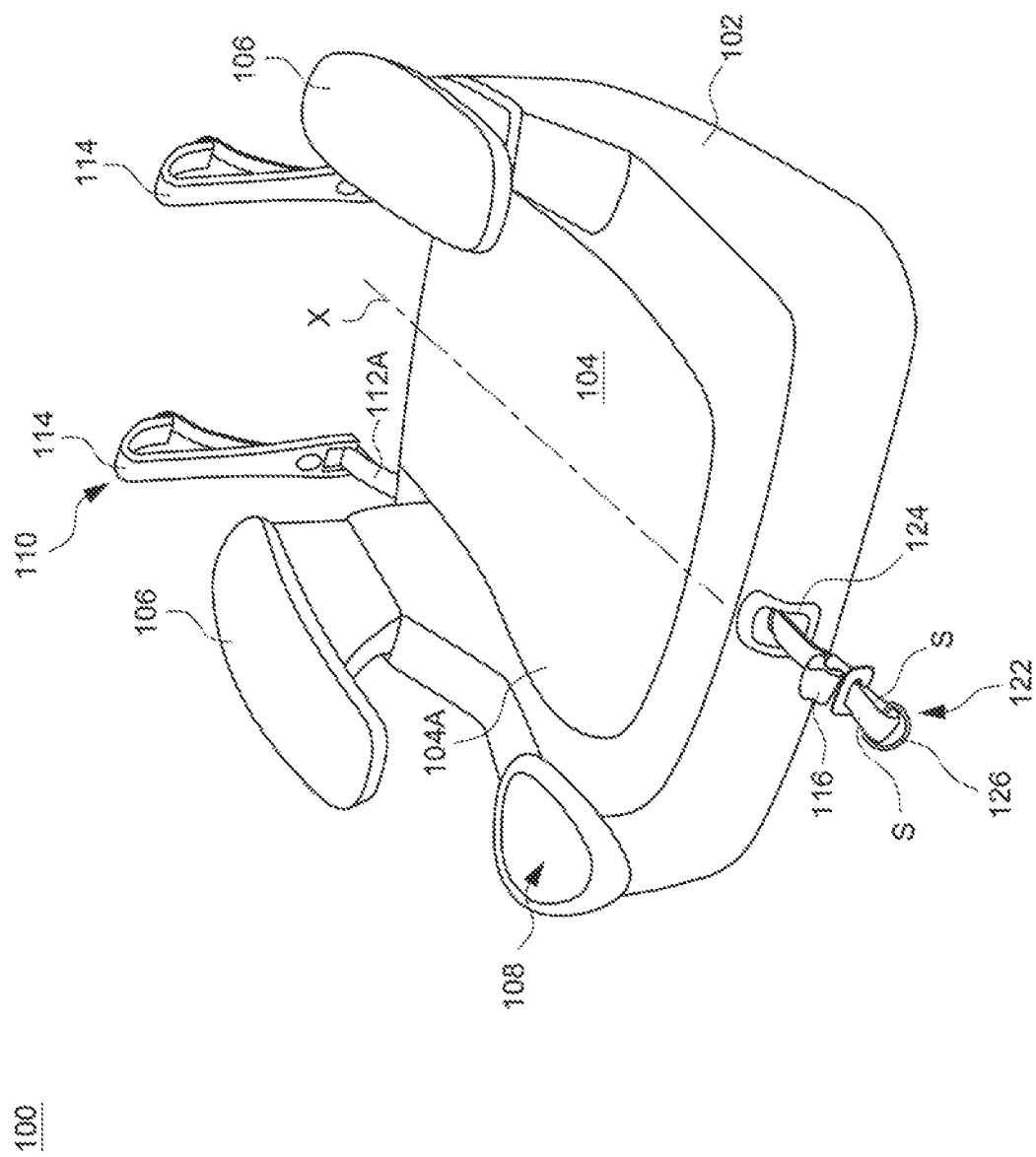
FIG. 4 is a perspective view illustrating another embodiment of the child seat in which the lock is not affixed with the seat shell.

In conjunction with FIGS. 1 and 2, FIG. 3 is a schematic view illustrating an exemplary construction of the lock 116. In one embodiment, the lock 116 may be securely held with the seat shell 102 adjacent to the front opening 124 of the seat shell 102. The lock 116 can include a base plate 130 affixed with the seat shell 102, an actuator arm 132 pivotally assembled with the base plate 132, and a spring 134 connected with the actuator arm 132. The two segments S of the intermediate portion 112B can pass through the lock 116 between the base plate 130 and the actuator arm 132. The spring 134 can be operable to bias the actuator arm 132 to a clamping position where a toothed portion 132A of the actuator arm 132 can tightly clamp a portion of the two segments S in overlapping contact with each other between the actuator arm 132 and the base plate 130. The actuator arm 132 may be rotated relative to the base plate 130 so as to disengage the toothed portion 132A out of contact with the intermediate portion 112B of the anchor strap 112, such that the intermediate portion 112B can be movably adjusted through the lock 116. While the lock 116 is in an unclamped state, the anchor strap 112 can be adjusted to increase either of an extension length of the two end portions 112A at the rear of the seat shell 102, and an extension length of the intermediate portion 112B at the front of the seat shell 102.

When the child seat 100 is to be installed on a vehicle's passenger seat, the lock 116 can be switched to the unlocking state by rotating the actuator arm 132, and the anchor strap 112 can be adjusted so as to increase the extension of the two end portions 112A at the rear of the seat shell 102. Increasing the extension of the two end portions 112A can facilitate the attachment of the fasteners 114 with the anchor structure of the vehicle's passenger seat. Once the fasteners 114 are properly attached, the tab 122 of the intermediate portion 112B can be pulled to tension the anchor strap 112 and have the seat shell 102 closely abutted against the backrest of the vehicle's passenger seat. The lock 116 then can be switched to the locking state by the biasing action from the spring 134 to tightly clamp and lock the anchor strap 112 with the seat shell 102. The child seat 100 thereby can be securely held on the vehicle's passenger seat.

For removing the child seat 100 from the vehicle's passenger seat, the lock 116 can be manually turned to the unlocking state for unclamping the anchor strap 112, and the seat shell 102 can be pulled in a direction (e.g., away from the backrest of the vehicle's passenger seat) that increases the extension of the two end portions 112A at the rear of the seat shell 102. The fasteners 114 then can be unlocked from the anchor structure of the vehicle's passenger seat for removal of the child seat 100.

While the foregoing has described a specific assembly of the lock 116, other configurations may also be suitable. FIG.

4 is a schematic view illustrating another embodiment of the child seat 100 in which the lock 116 is not affixed with the seat shell 102. Instead, the lock 116 can be assembled with the anchor strap 112 so as to be movable along the two segments S of the intermediate portion 112B either away or toward the front edge of the seat shell 102. When longer extension of the two end portions 112A at the rear of the seat shell 102 is needed, the lock 116 can be unlocked and adjustably moved along the two segments S of the intermediate portion 112B away from the front opening 124 of the seat shell 102. The two end portions 112A then may be pulled out to increase their respective length outside the seat shell 102. To tighten the attachment of the child seat 100 (e.g., after the fasteners 114 engage with the anchor structure of the vehicle's passenger seat), the lock 116 can be unlocked and moved along the two segments S of the intermediate portion 112B to lie in contact against the front edge of the seat shell 102. Meanwhile, the tab 122 can be pulled out from the lock 116 so that the anchor strap 112 becomes tensioned and the seat shell 102 abutted against the backrest of the vehicle's passenger seat.

Figure 5:
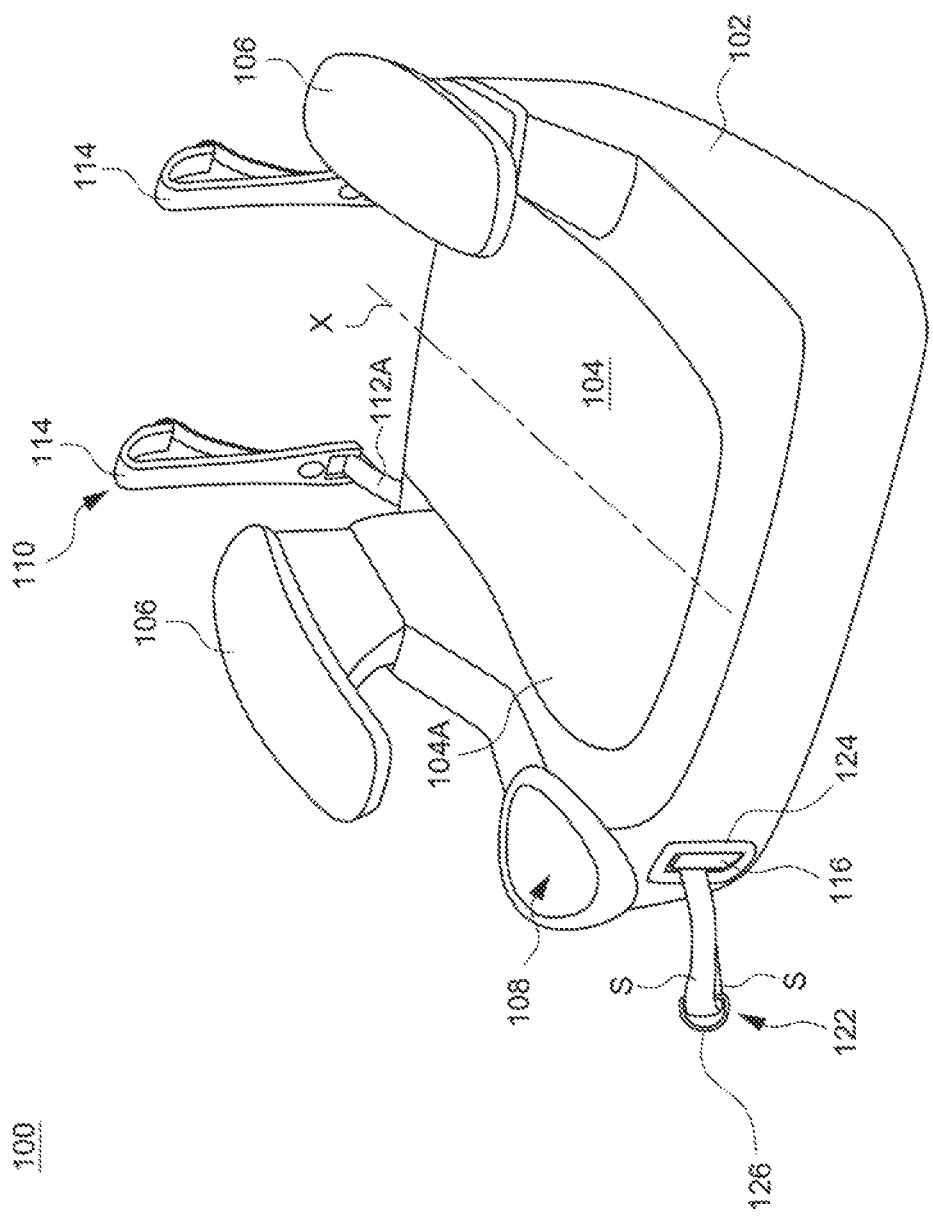
FIG. 5 is a perspective view illustrating a variant embodiment of the child seat in which the lock and tab of the anchor strap are laterally offset from a central longitudinal axis of the seat shell.
Figure 6:
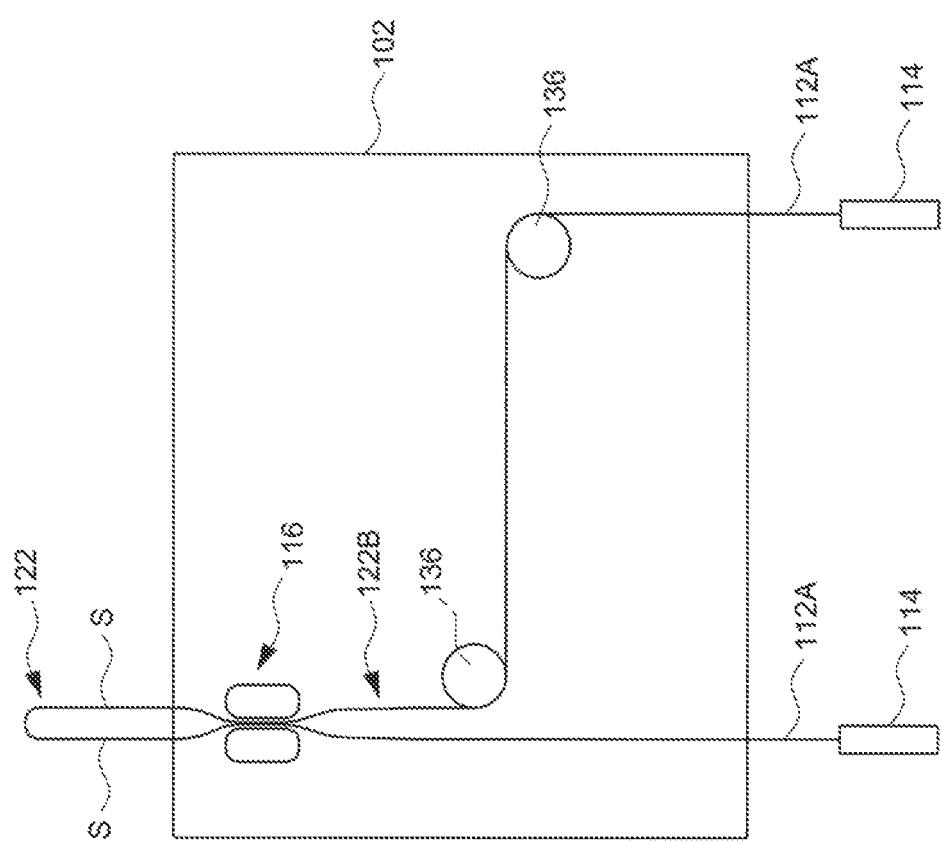
FIG. 6 is a schematic view illustrating how the anchor strap is guided in the child seat shown in FIG. 5.

The position of the lock 116 and tab 122 on the seat shell 102 may also be changed according to design needs. FIGS. 5 and 6 are schematic views illustrating a variant embodiment in which the positions of the lock 116 and the tab 122 may be laterally offset from the central longitudinal axis X of the seat shell 102. For example, the lock 116 and the tab 122 may be placed adjacent to a left or right front corner of the seat shell 102. As better shown in FIG. 6, the guide structure 118 provided in the seat shell 102 can be accordingly configured to guide the passage of the anchor strap 112 through the seat shell 102 so that the intermediate portion 112B can be guided toward one front corner of the seat shell 102, and the two end portions 112A can be guided toward the rear of the seat shell 102. Examples of construction of the guide structure 118 can include guiding parts 136 such as pins, rollers, pulleys and the like, around which the anchor strap 112 may be wrapped and guided.

Figure 7:
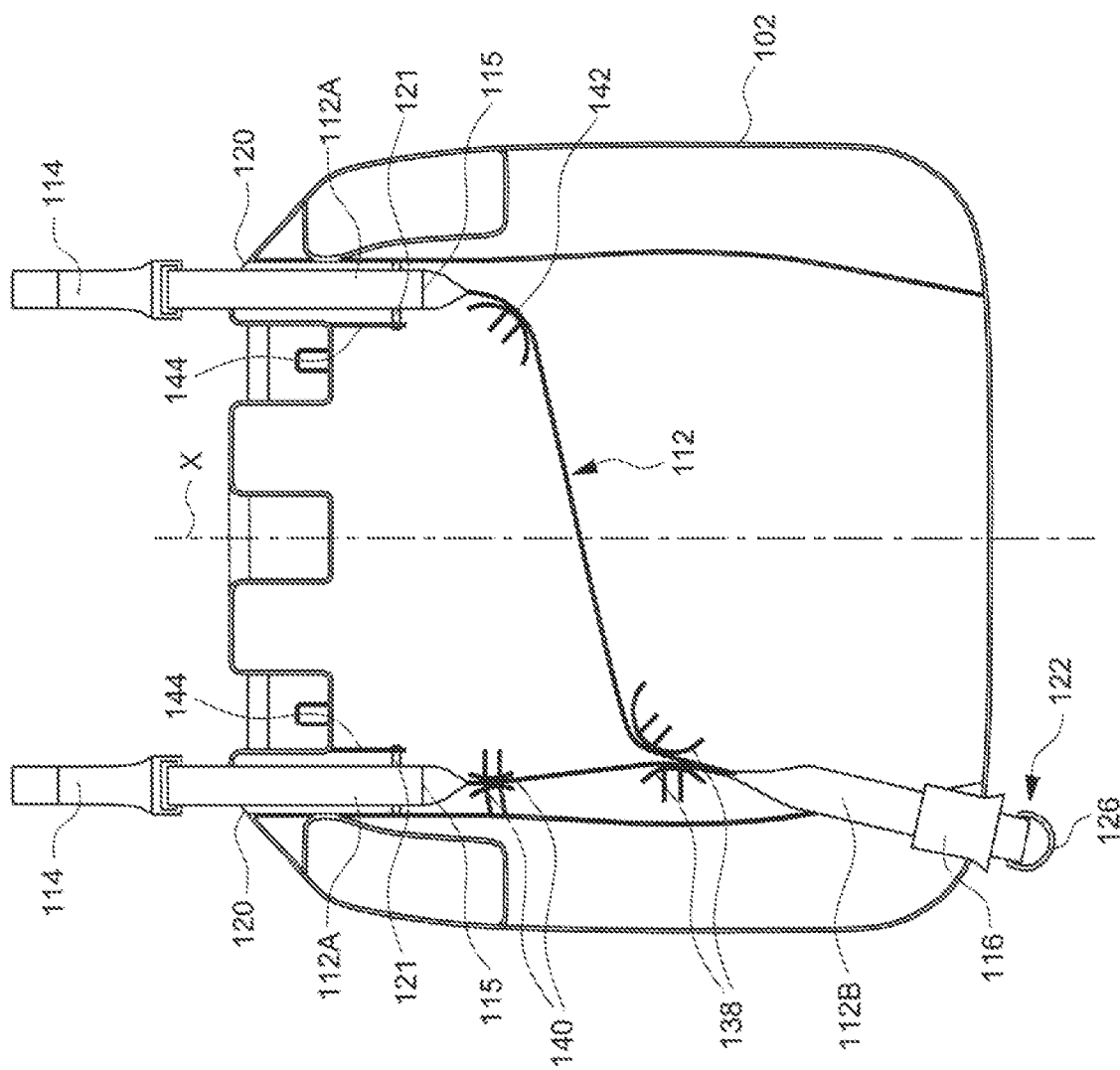
FIG. 7 is a schematic view illustrating another possible embodiment for guiding the web material of the anchor strap in an embodiment where the lock and tab of the anchor strap are laterally offset from a central longitudinal axis of the seat shell.

FIG. 7 is a schematic view illustrating another example of a guiding structure provided in the seat shell 102 for guiding the web material of the anchor strap 112. The guiding structure can include a first pair of opposing sidewalls 138 disposed adjacent to each other at a location laterally offset from the central axis X, a second pair of opposing sidewalls 140 disposed behind the sidewalls 138 on the same side relative to the central axis X, a rib 142 disposed on the other side of the central axis X, and slots 144 disposed symmetrically relative to the axis X and adjacent to the rear openings 120.

The web material of the anchor strap 112 can be folded to form the looped tab 122 assembled with the lock 116 at a front corner of the seat shell 102. The folded web material can pass through the narrow passage between the two sidewalls 138 in an upright position, and then has two segments that respectively diverge toward the rib 142 and the sidewalls 140. These two divergent segments can respectively pass through the passage between the sidewalls 140 and wrap around the rib 142 in upright positions, and then twist to horizontal positions before extending as the end portions 112A through the slots 144 toward the rear openings 120. Like previously described, each of the two end portions 112A of the anchor strap 112 can form a loop structure that is secured with one fastener 114. Fixed pins 121 can also respectively pass through the looped end portions 112A, and interact with sewing lines 115 to limit the extension of the end portions 112A.

Because the interior of the vehicle is usually accessed from lateral sides, the placement of the lock 116 and tab 122 adjacent to one corner of the seat shell 102 as illustrated in FIGS. 5-7 may provide easier access for operation.

Figure 8:
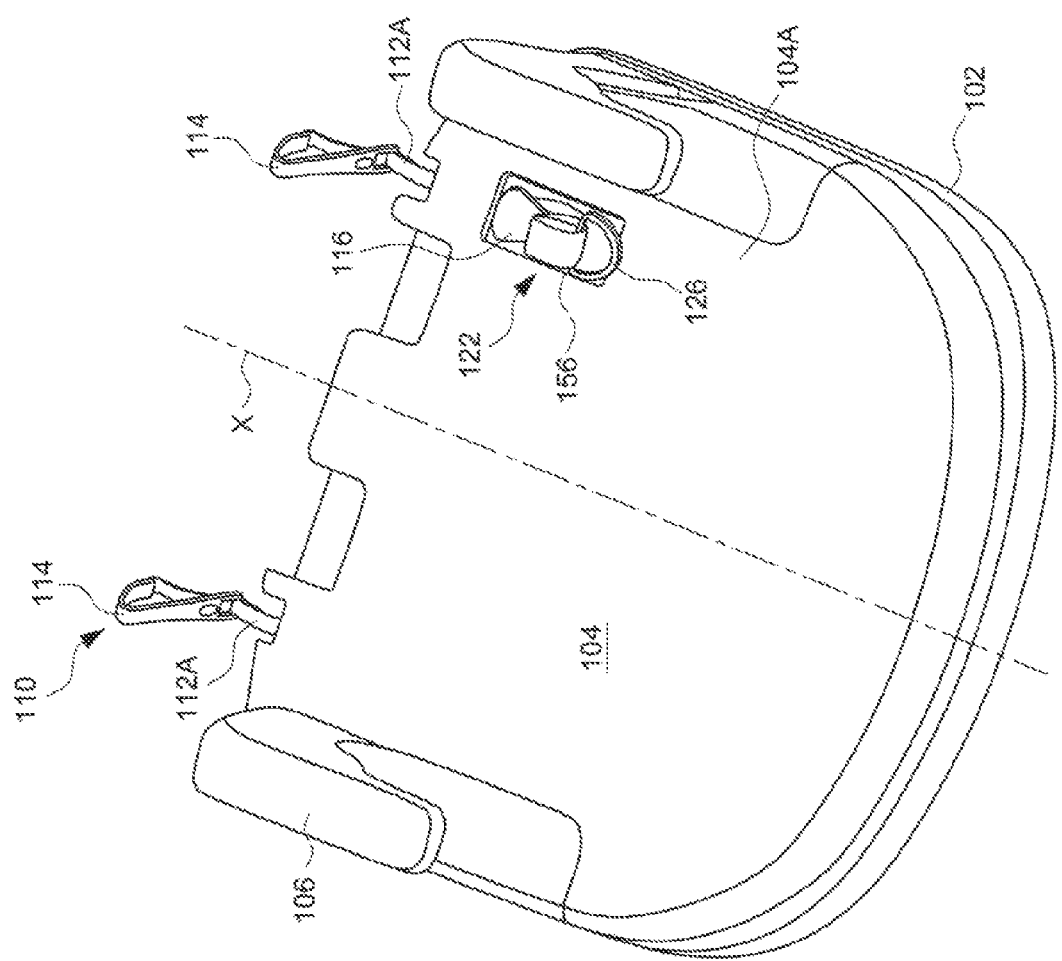
FIG. 8 is a perspective view illustrating another variant embodiment of the child seat in which the lock and tab of the anchor strap are placed adjacent to a rear of the seat shell.
Figure 9:
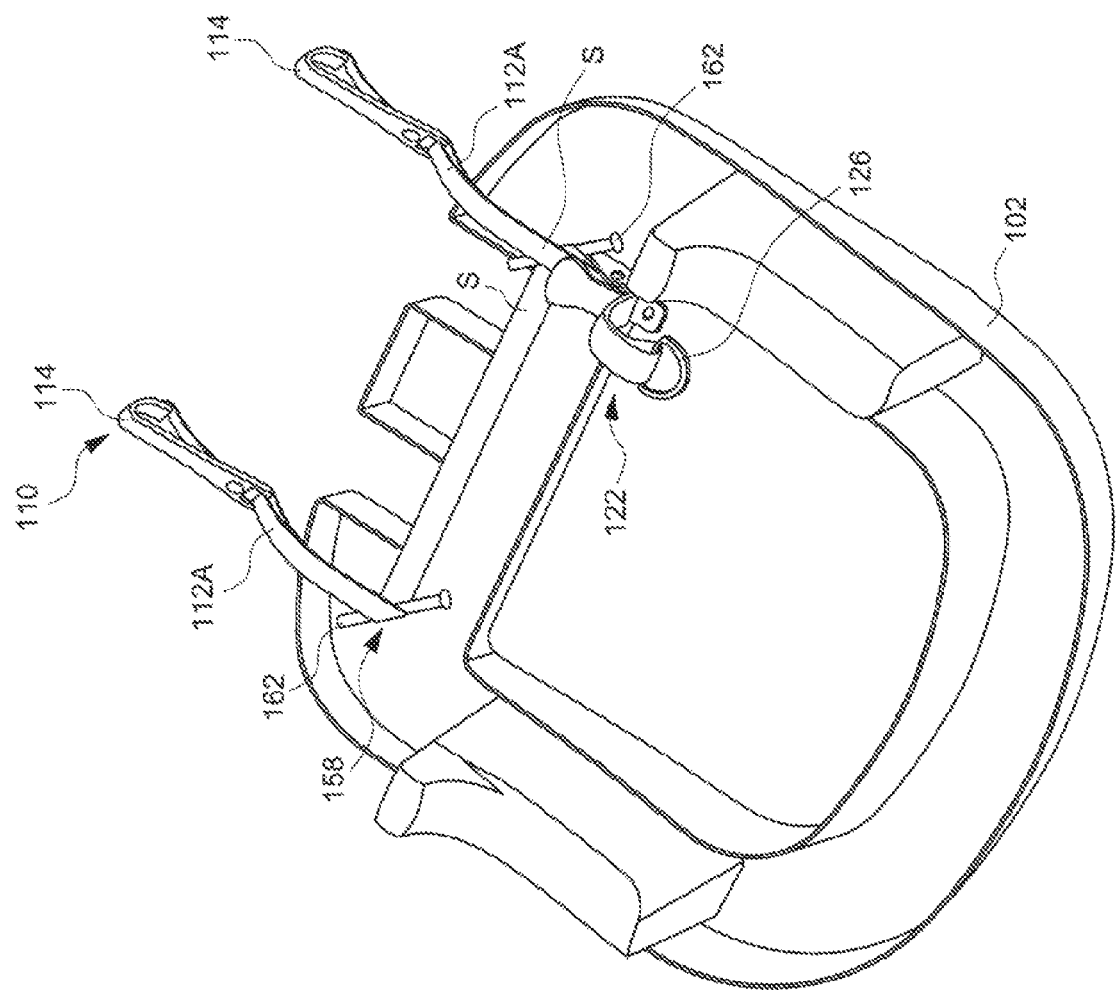
FIG. 9 is a schematic views illustrating how the anchor strap is guided in the child seat shown in FIG. 8.

FIGS. 8 and 9 are schematic views illustrating another variant embodiment of the child seat in which the lock 116 and the tab 122 may be placed adjacent to a rear of the seat shell 102. As shown, the lock 116 and the tab 122 may be disposed adjacent to on the upper surface 104A of the seat portion 104, e.g., in a recessed pocket 156 thereof. The lock 116 and the tab 122 may be located adjacent to the rear and laterally offset from the central longitudinal axis X to a side of the seat shell 102 (e.g., close to a left or right corner of the seat shell 102). In other embodiments, the lock 116 and the tab 122 may also be disposed near the rear of the seat shell 102 and substantially aligned with the central longitudinal axis X.

As better shown in FIG. 9, the seat shell 102 can be provided with a guide structure 158 that is configured to guide the passage of the anchor strap 112 through the seat shell 102. The guide structure 158 can include two guiding parts 162 (e.g., pins) that are spaced apart from each other in a transversal direction (i.e., parallel to a width of the seat shell 102). Like previously described, the intermediate portion 112B of the anchor strap 112 can be folded into two overlapping segments S that pass through the lock 116. A first one of the two segments S can extend from the lock 116 opposite to the tab 122, travel at one of the left and right sides of the seat shell 102 (e.g., right side as shown in FIG. 9) substantially parallel to the central longitudinal axis X toward the rear, and form one end portion 112A that extends outward through one rear opening 120. A second one of the two segments S can extend from the lock 116 opposite to the tab 122, wrap around a first guiding part 162 and travel away from the first segment S along a width of the seat shell 102, and then wrap around a second guiding part 162 and extend rearward at the other lateral side of the seat shell 102 (e.g., left side as shown in FIG. 9).

The placement of the lock 116 and the tab 122 near the rear of the seat shell 102 as shown in FIGS. 8 and 9 may also be advantageous. In particular, because the lock 116 and the tab 122 become closer to the fasteners 114, the caregiver can easily operate the lock 116 and the tab 122, and adjust the extension of the fasteners 114 from the rear of the seat shell 102.

Figure 10:
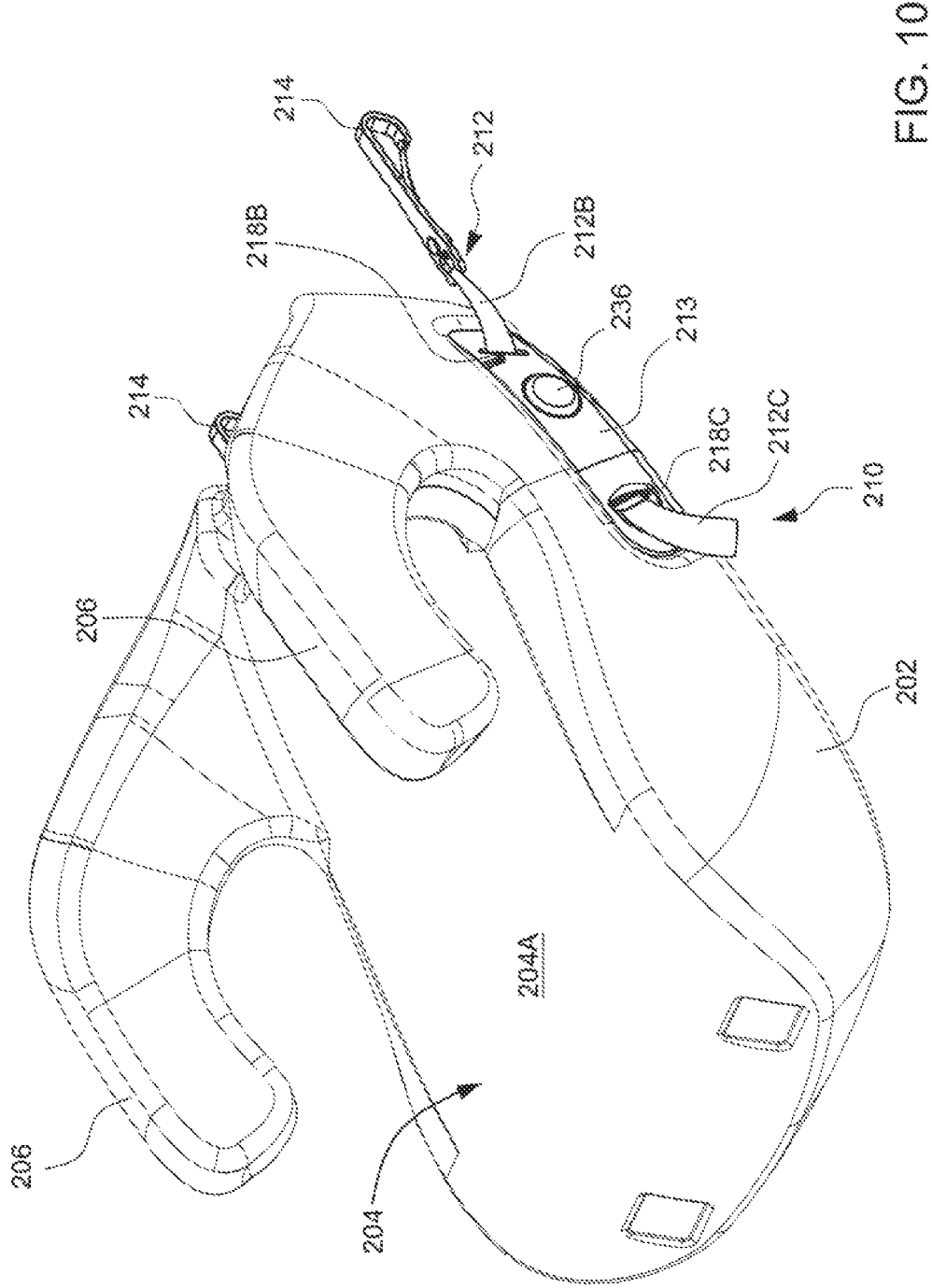
FIG. 10 is a schematic view illustrating another embodiment of a child seat provided with a restraint system.

FIG. 10 is a schematic view illustrating another embodiment of a child seat 200 provided with a restraint system. The child seat 200 can be exemplary a booster seat having a seat shell 202 formed by plastic molding. The seat shell 202 can include a seat portion 204 and armrests 206. The seat portion 204 can have an upper surface 204A on which a child can sit, and a bottom that can define a support plane for stable placement of the seat shell 202 on a vehicle's passenger seat. The armrests 206 may be integrally formed with the seat portion 204, or removably assembled therewith.

Figure 11:
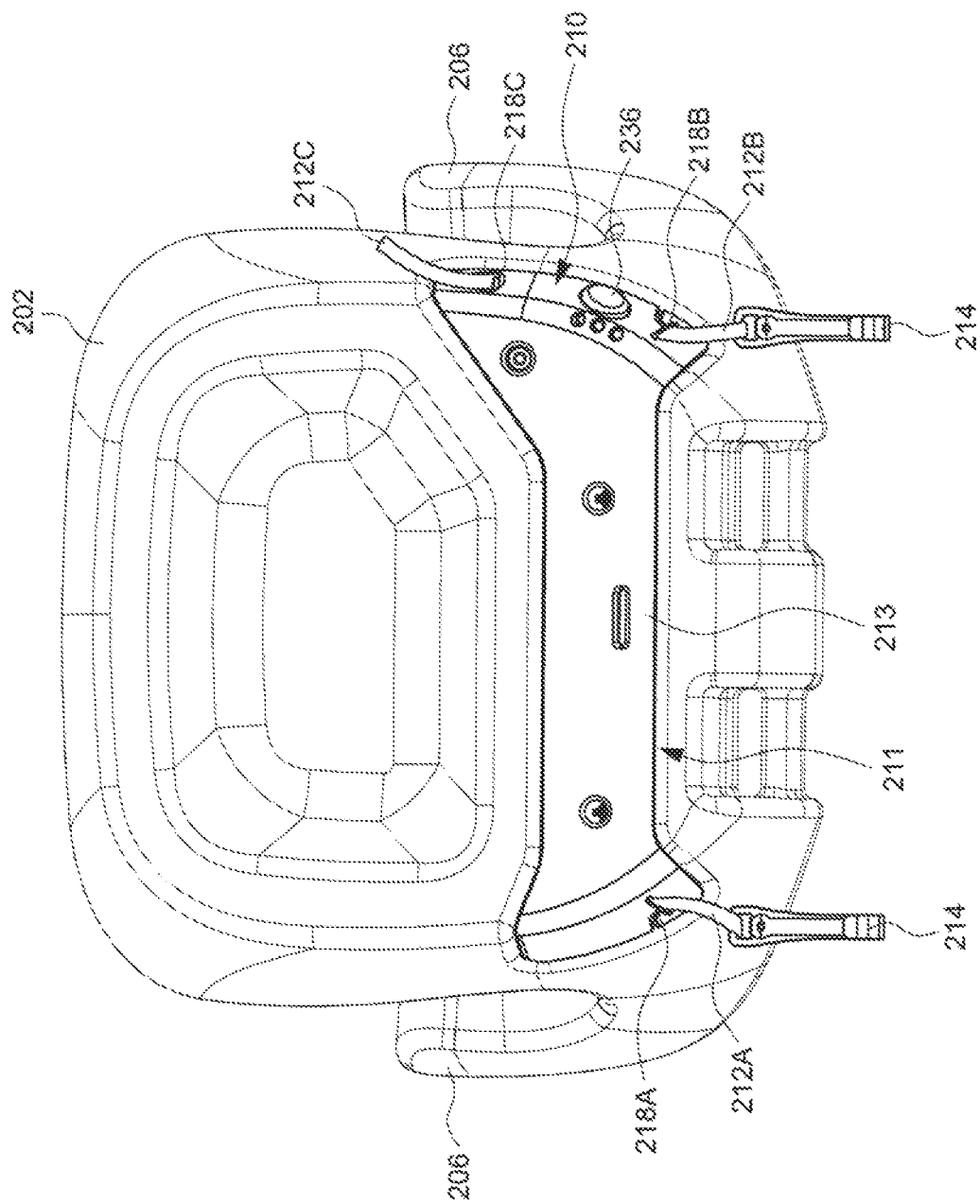
FIG. 11 is a bottom view of the child seat shown in FIG. 10.

In conjunction with FIG. 10, FIG. 11 is a bottom view of the child seat 200. The restraint system 210 can be received in an inner cavity 211 of the seat shell 202 that is located near the rear of the child seat 200 and is opened at the underside of seat shell 202. In one embodiment, the restraint system 210 can be assembled with a casing 213, which in turn can be fixedly installed in the inner cavity 211 of the seat shell 202. This construction can facilitate the installation of the restraint system 210 in the seat shell 202. However, it will be appreciated that alternate embodiments can also have the restraint system assembled within the inner cavity 211 of the seat shell 202. The restraint system 210 can include an anchor strap 212, two fasteners 214 and a lock 216. The anchor strap 212 can be made of a single continuous web material that is guided through the interior of the casing 213 to define two end portions 212A and 212B and a looped tab 212C. The end portions 212A and 212B of the anchor strap 212 can respectively extend outside the seat shell 202 through two slits 218A and 218B of the casing 213 that are located at the left and right sides and near the rear of the seat shell 202, and can be respectively connected with the fasteners 214. The looped tab 212C can extend outside the seat shell 202 from a slit 218C of the casing 213 that is located at the same side (e.g., right side as shown) and in front of the slit 218B.

Figure 12:
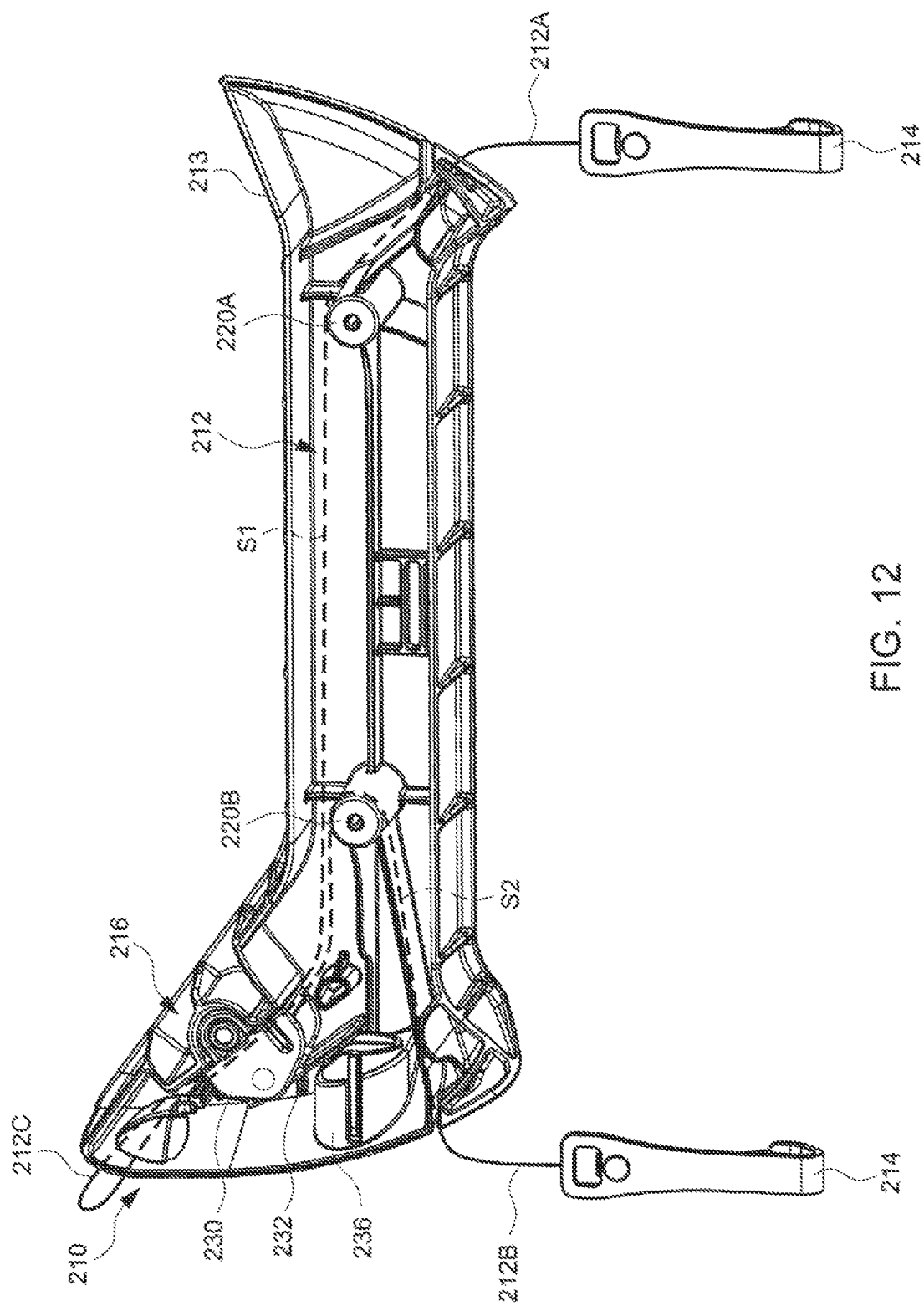
FIG. 12 is a schematic view illustrating the installation of the restraint system with a casing in the child seat shown in FIG. 10.
Figure 13:
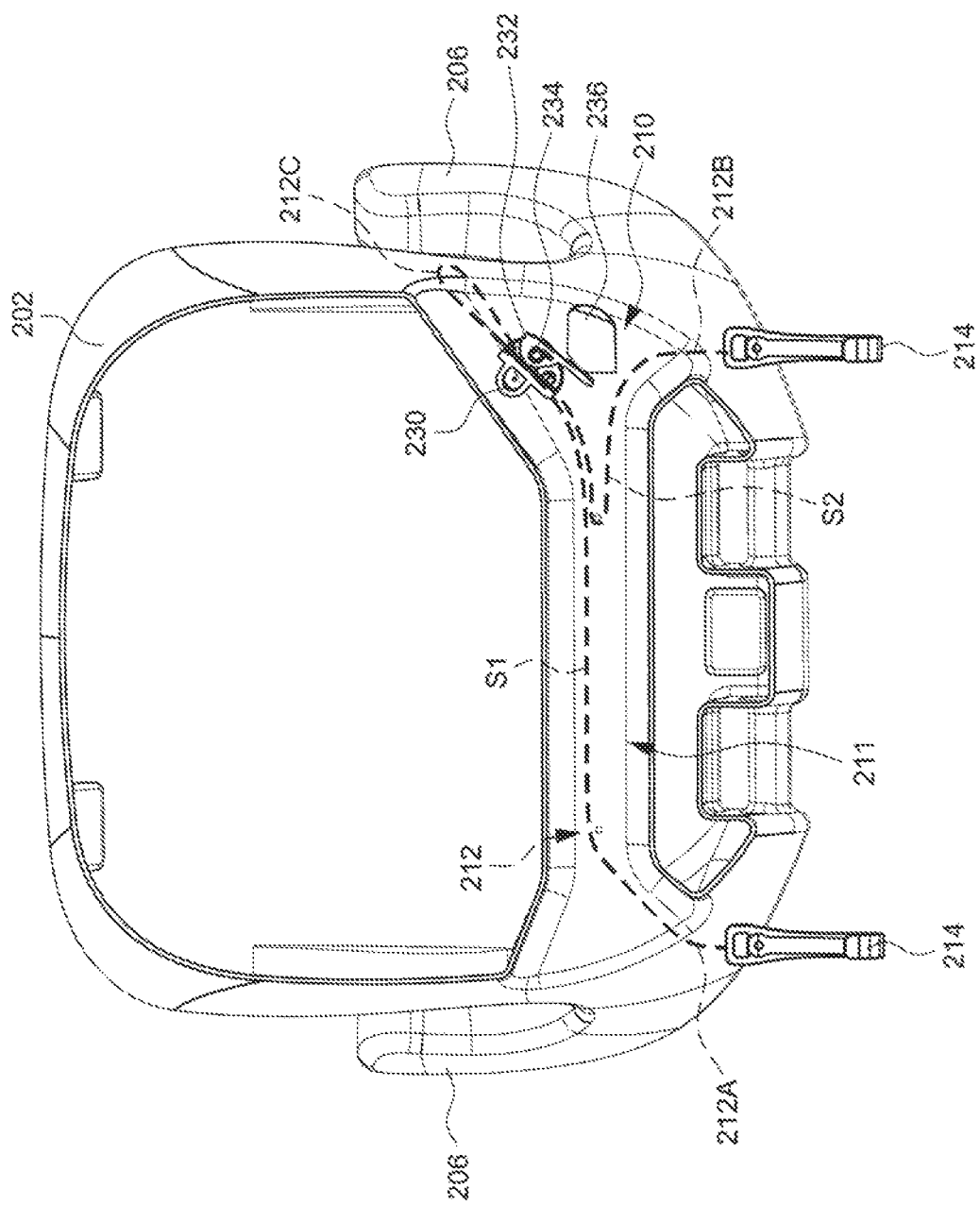
FIG. 13 is a schematic view showing placement of the restraint system in the seat shell of the child seat shown in FIG. 10.

FIG. 12 is a schematic view illustrating the installation of the restraint system 210 with the casing 213, and FIG. 13 is a schematic view of the seat shell 202 without the casing 213 showing the placement of the restraint system 210 in the inner cavity 211 of the seat shell 202. Referring to FIG. 12, the web material can be folded over itself to define the looped tab 212C and form two strap segments S1 and S2 that respectively pass through the slit 218C and the lock 216. At a side of the lock 216 opposite to that of the looped tab 212C, the segment S2 can wrap around a guide structure 220B and then travel through the slit 218B to form the end portion 212B, whereas the other segment S1 can be routed transversally and wrap around another guide structure 220A before passing through the slit 218A to form the end portion 212A. In one embodiment, the guide structures 220A and 220B can be formed as spaced-apart posts protruding from an inner sidewall of the casing 213. The guide structure 220B can be transversally offset away from the lock 216 and the slit 218B so as to suitably tension the strap segment S2.

Referring to FIGS. 12 and 13, the lock 216 may be securely held with the casing 213, and may have a construction similar to the locks described previously including a base 230 affixed with the seat shell 202, an actuator arm 232 pivotally assembled with the base 230, and a spring 234 connected with the actuator arm 232. The two strap segments S1 and S2 can pass through the lock 216 between the base 230 and the actuator arm 232. The actuator arm 232 can be biased by the spring 234 toward a clamping position where it can tightly clamp portions of the two strap segments S1 and S2 against the base 230. A button 236 may be connected with the actuator arm 232 for facilitating its operation. The button 236 may be accessible from a side of the seat shell 202 at a location between the slits 218B and 218C. A pressure applied on the button 236 can cause rotation of the actuator arm 232 relative to the base plate 230 so as to unclamp the strap segments S1 and S2, such that the anchor strap 212 can be operated to adjust the extension length of the two end portions 212A and 212B and the looped tab 212C.

When the child seat 200 is to be installed on a vehicle's passenger seat, the button 236 can be depressed to as to turn the lock 216 to the unlocking state, and the anchor strap 212 can be adjusted so as to increase the extension of the two end portions 212A and 212B at the rear of the seat shell 202. Once the fasteners 214 are properly attached, the tab 212C can be pulled to tension the anchor strap 212 and have the seat shell 202 closely abutted against the backrest of the vehicle's passenger seat. The button 236 then can be released so that the lock 216 can be switched to the locking state to tightly clamp and lock the anchor strap 212.

For removing the child seat 200 from the vehicle's passenger seat, the button 236 can be depressed to as to turn the lock 216 to the unlocking state for unclamping the anchor strap 212, and the seat shell 202 can be pulled in a direction (e.g., away from the backrest of the vehicle's passenger seat) that increases the extension of the two end portions 212A and 212B. The fasteners 214 then can be unlocked from the anchor structure of the vehicle's passenger seat for removal of the child seat 200.

At least one advantage of the child seats described herein is the ability to provide internal restraint systems that are simple in construction, and easy to operate. The use of a single continuous web material for the anchor strap can simplify the construction of the restraint systems, and reduce the manufacture cost. The restraint systems described herein can be advantageously applied for child seats of simpler constructions, such as booster seats.

Realizations of the child seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child seat comprising:
    a seat shell having a rear;
    two fasteners operable to attach with an anchor structure of a vehicle, the two fasteners respectively including two slots;
    an anchor strap made of a single length of a continuous web material that forms two end portions and an intermediate portion between the two end portions, wherein the two end portions respectively loop around the two slots of the two fasteners, and the intermediate portion is folded over to define two segments of the web material; and
    a lock operable to releasibly clamp a portion of the two segments, the intermediate portion extending outward from the lock to define a looped tab that is accessible from an outside of the seat shell.

2. The child seat according to claim 1, wherein the lock is substantially aligned with a central longitudinal axis of the seat shell.

3. The child seat according to claim 1, wherein the lock is laterally offset from a central longitudinal axis of the seat shell.

4. The child seat according to claim 1, wherein the lock is located adjacent to one of a left and right front corners of the seat shell.

5. The child seat according to claim 1, wherein the seat shell defines a seat portion having an upper surface, and the lock is located at the upper surface adjacent to the rear of the seat shell.

6. The child seat according to claim 5, wherein the lock is further located near one of two lateral side edges of the seat shell.

7. The child seat according to claim 1, wherein the lock is securely assembled with the seat shell.

8. The child seat according to claim 1, wherein the lock is movable along the two segments of the anchor strap away from the seat shell.

9. The child seat according to claim 1, wherein the two segments of the web material includes a first segment and a second segment, and the seat shell includes a guide structure configured to guide passage of the first segment and the second segment from the lock toward the rear of the seat shell.

10. The child seat according to claim 9, wherein the seat shell has a left side and a right side, the first segment extends at one of the left and right sides substantially parallel to a longitudinal axis extending from a front to the rear of the seat shell, and the second segment extends away from the first segment along a width of the seat shell toward the other one of the left and right sides.

11. The child seat according to claim 1, wherein the guide structure includes pins, rollers, pulleys and the like.

12. The child seat according to claim 1, wherein the two end portions respectively loop about the two fasteners.

13. The child seat according to claim 1, being implemented as a booster seat.

14. The child seat according to claim 1, wherein the seat shell defines a seat portion having an upper surface, and two openings located at the rear and below the upper surface of the seat portion, the anchor strap lying in the seat shell below the upper surface, and the two end portions extending outward from the rear via the two openings.

15. A child seat comprising:
a seat shell having a hollow interior provided with a strap guiding structure, the strap guiding structure including two opposing sidewalls adjacent to each other;
an anchor strap assembly formed from a web material, the web material forming two end portions and an intermediate portion of the anchor strap assembly, the intermediate portion being connected between the two end portions, and the two end portions being located at the rear of the seat shell and respectively provided with two fasteners operable to attach with an anchor structure of a vehicle, wherein the web material travels in an upright position through a passage defined between the two sidewalls, and then twists to a generally horizontal position in a region between the two sidewalls and the rear of the seat shell, the two sidewalls being substantially close to each other so as to block twisting of the web material in the passage between the two sidewalls; and
a lock operable to releasibly clamp a portion of the anchor strap assembly, the intermediate portion extending outward from the lock to define a looped tab that is accessible from an outside of the seat shell.

16. The child seat according to claim 15, wherein the passage between the two sidewalls is substantially smaller than a width of the web material.

17. The child seat according to claim 15, wherein the intermediate portion is folded over to define two segments of the web material, and the lock releasibly clamps a portion of the two segments.

18. The child seat according to claim 15, wherein at least one of the two end portions forms a loop structure through which a pin affixed with the seat shell is passed, the pin lying close to a horizontal plane.

19. The child seat according to claim 15, wherein the lock is located adjacent to one of a left and right front corners of the seat shell.

20. The child seat according to claim 15, wherein the strap guiding structure defines a channel along which the web material is routed, the intermediate portion is folded over to define two segments of the web material, the two segments adjacently overlapping with each other in a region of the channel near the lock, and the two segments extending apart from each other respectively along two divergent portions of the channel.

21. The child seat according to claim 20, wherein the two segments lie upright along the two divergent portions of the channel.

22. The child seat according to claim 20, wherein at least one of the two divergent portions includes the two sidewalls.

23. A child seat comprising:
a seat shell having a rear and a channel, the channel having two divergent portions;
two fasteners operable to attach with an anchor structure of a vehicle, the two fasteners respectively including two slots;
an anchor strap assembled in the seat shell and connected with the two fasteners, the anchor strap being made of a single length of a continuous web material having two end portions and an intermediate portion between the two end portions, the two end portions respectively looping around the two slots of the fasteners at the rear of the seat shell, and the intermediate portion being folded over to define two segments of the web material, wherein the anchor strap is routed along the channel, and the two segments extend apart from each other respectively along the two divergent portions of the channel, at least one of the two divergent portions including two sidewalls that are substantially close to each other so as to block twisting of a first one of the two segments guided between the two sidewalls, the first segment twisting to a generally horizontal position in an area between the two sidewalls and the rear of the seat shell; and
a lock operable to releasibly clamp a portion of the two segments against each other, the two segments adjacently overlapping with each other in a region of the channel near the lock, the two segments of the web material passing through the lock, and the intermediate portion extending outward from the lock to define a looped tab that is accessible from an outside of the seat shell.

24. The child seat according to claim 23, wherein the two segments lie upright along the two divergent portions of the channel.

25. The child seat according to claim 23, wherein the two segments twist to a generally position in an area between the two sidewalls and the lock.

* * * * *